2,886,572

2-AMINOBENZOXAZOLES

Edward L. Engelhardt, Gwynedd Valley, Pa., assignor to Merck & Co., Inc., Rahway, N.J., a corporation of New Jersey No Drawing. Application April 1, 1957
Serial No. 649,616

6 Claims. (Cl. 260—307)

This invention is concerned with benzoxazoles and in particular with 2-aminobenzoxazoles and especially those compounds wherein the amino group attached to the benzoxazole radical is a part of an alkylenediamine system and with methods for preparing these compounds.

The 2-aminobenzoxazoles of this invention can be represented by the following structural formula:

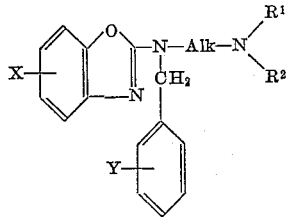

and includes, also, their acid addition salts, wherein X and Y respectively represent hydrogen, halogen, e.g., chlorine, bromine, iodine or fluorine, an alkyl radical, advantageously a lower-alkyl radical, preferably having from 1 to 4 carbon atoms, or an alkoxy radical, advantageously a lower-alkoxy and preferably an alkoxy radical having from 1 to 4 carbon atoms; Alk is a straight or branched chain lower alkylene group advantageously having from 1 to 4 carbon atoms; and

is a tertiary amino radical, preferably a di-lower alkyl amino radical wherein each of the alkyl radicals preferably has from 1 to 4 carbon atoms, or a nitrogen-containing heterocyclic radical containing 5 or 6 atoms in the heterocyclic ring such as a pyrrolidyl, piperidyl or morpholinyl radical. Any one or more of the alkyl or alkoxy radicals represented by the variable radicals X, Y, $R^1$ and $R^2$ can be either straight or branched chained.

The compounds of this invention possess local anesthetic and antifibrillatory properties, and because of these properties the compounds are useful as local anesthetics and in the control of cardiac arhythmias. The compounds for all practical purposes can be administered either orally or intravenously preferably in the form of their salts. The dosage level will, of course, vary and for this reason tablets or capsules containing from about 100 to 1000 milligrams of the active ingredient can be made available to the physician for the symptomatic adjustment of dosage to the individual patient. Sterile solutions containing from about 50 to about 150 milligrams of the active ingredient per dosage unit also can be made available to the physician for administration on the same basis. All of these dosages are well below the toxic or lethal dose of the compounds falling within the scope of this invention. Chronic toxicity studies in dogs using N-(2-benzoxazolyl)-N-benzyl-N′,N′-dimethylethylenediamine hydrochloride have demonstrated that dosages as high as 20 milligrams per kilogram per day (calculated as the base) administered orally over a period of ten weeks, were tolerated without any untoward toxic manifestations. The lethal dose in mice, $LD_{50}$, has been found to be 22.9 milligrams per kilogram intravenously and 198 milligrams per kilogram orally. It is evident from these data that pharmaceutical compositions containing the dosages described above fall well below the lethal dose of this compound and are substantially below the 20 milligram per kiogram dose which was well tolerated by dogs over a reasonably long period of time.

Tablets or capsules containing the novel compounds of this invention can be prepared using conventional diluents, extenders and binders and isotonic solutions containing the active ingredient also can be prepared by conventional methods.

The novel compounds of this invention are advantageously prepared by condensing a 2-halobenzoxazole with the appropriate alkylenediamine advantageously in the presence of a suitable solvent, such as benzene, phenol, quinoline and the like.

The acid addition salts of the 2-aminobenzoxazoles such as those derived from the mineral acids as hydrochloric, hydrobromic, hydriodic, sulfuric, phosphoric acids and the like, or those derived from organic acids as tartaric, acetic, p-toluenesulfonic acids and the like are prepared by methods well known to chemists, such as by dissolving the compounds in alcohol and adding the calculated quantity of the desired acid. The salt is isolated by evaporating the solvent and it can be recrystallized from a suitable solvent such as a mixture of alcohol and ether if desired.

While the above method can be employed with advantage in preparing the novel compounds of this invention, it is not intended that this invention be limited to the compounds when prepared by any one particular procedure.

The following examples will illustrate the preparation of the novel compounds of this invention but it is to be understood that modification within the above described conditions can be made without departing from the scope of this invention.

EXAMPLE 1

N-(2-benzoxazolyl)-N-benzyl-N′,N′-dimethylethylenediamine hydrochloride 2-chlorobenzoxazole (15.36 g., 0.1 mole), was added to a solution of N-benzyl-N′,N′-dimethylethylenediamine (17.83 g., 0.1 mole) in quinoline (20 ml.), with shaking and cooling. After the addition was complete, the reaction became vigorous liberating considerable heat. When the vigorous reaction had subsided the mixture was heated to 150° C. for 16 hours in an oil bath. The reaction mixture then was treated with 20% sodium hydroxide (50 ml.), and steam-distilled until free of quinoline. The residue from the steam-distillation was extracted with two 100 ml. portions of absolute ether, the extract washed with water and dried over sodium sulfate. The ether was evaporated and the dark colored residue distilled through a 10 cm. Vigreux column. The fraction boiling between 155 and 160° C. (0.07 mm.) was collected. The product weighed 8.94 g. This material was dissolved in 25 ml. of absolute alcohol and the solution treated with 4.0 ml. of a 7.56 N solution of dry hydrogen chloride in absolute alcohol. Absolute acetone (50 ml.) was added and the solution diluted with absolute ether to incipient crystallization. The buff-colored N-(2-benzoxazolyl)-N-benzyl - N′,N′ - diethylethylenediamine hydrochloride, M.P. 203°–206° C. weighed 7.28 g. Recrystallization from a mixture of absolute alcohol, acetone and ether gave 5.72 g. of product, M.P. 212°–213.5° C. (sintered at 211° C.). Further recrystallization did not change the melting point. The recrystallized product was a white, crystalline, water soluble solid.

Analysis for $C_{18}H_{21}ON_3 \cdot HCl$: Calculated: C, 65.15; H, 6.68; N, 12.66. Found: C, 65.15; H, 6.55; N, 12.66.

EXAMPLE 2

N-(2-benzoxazolyl)-N-benzyl-N',N'-dimethyl-1,3-propanediamine hydrobromide 2-chlorobenzoxazole (15.36 g., 0.1 mole) was added to a solution of N-benzyl-N',N'-dimethyl-1,3-propanediamine (19.23 g., 0.1 mole) in phenol (75 g.). Heat was evolved after a few minutes and when the exothermic reaction had subsided the mixture was heated in an oil bath at 150° C. for 24 hours. The reaction mixture then was treated with concentrated hydrochloric acid (10 ml.) and steam-distilled until free of phenol. The residue was treated with 25 ml. of concentrated hydrochloric acid and extracted while hot with two 100 ml. portions of chloroform. The aqueous layer was separated and made basic with sodium hydroxide. The oily base that separated was extracted into benzene, the benzene evaporated and the residue distilled through a 10 cm. Vigreux column. The fraction boiling between 177 and 182° C. (0.05 mm.) weighed 14.06 g. It was dissolved in 25 ml. of alcohol (3A anhydrous) and this solution treated with 5.22 ml. of an 8.72 N solution of hydrobromic acid. The solvent was evaporated on the steam-bath under reduced pressure and the residue recrystallized from a mixture of absolute alcohol, acetone and absolute ether. The N-(2-benzoxazolyl)-N-benzyl - N',N' - dimethyl-1,3-propanediamine hydrobromide, M.P. 166.5°–168° C. weighed 15.66 g. Further recrystallizations gave a product, M.P. 167.5°–168.5° C.

Analysis for $C_{19}H_{23}ON_3 \cdot HBr$: Calculated: C, 58.46; H, 6.20; N, 10.77. Found: C, 58.30; H, 6.30; N, 10.70.

EXAMPLE 3

N-(2-benzoxazolyl)-N-benzyl-N',N'-dimethylethylenediamine hydrochloride

A mixture of N-benzyl-N',N'-dimethylethylenediamine (35.6 g., 0.2 mole), potassium carbonate (41.5 g., 0.3 mole) and benzene (300 ml.) was stirred while 2-chlorobenzoxazole (30.7 g., 0.2 mole) was added dropwise with stirring over a period of 1¼ hours. The temperature of the reaction mixture rose to about 45° C. during the addition. The mixture was stirred for an additional 2½ hours then heated to refluxing with stirring for 30 minutes. After cooling the reaction mixture to room temperature, water (100 ml.) was added. The benzene layer was separated, washed with water and the solvent distilled. The residue was distilled under reduced pressure and the product, B.P. 195°–210° C. (1.2 mm.) collected. The viscous yellow base, N-(2-benzoxazolyl)-N-benzyl-N',N'-dimethylethylenediamine, weighed 48.0 g. The base was dissolved in absolute ethyl acetate, and the solution treated with one equivalent of hydrogen chloride dissolved in methanol. The N-(2-benzoxazolyl)-N-benzyl-N',N'-dimethylethylenediamine hydrochloride was obtained as colorless crystals, M.P. 209°–210° C. (sintered at 207° C.). Additional material was obtained from the mother liquors that melted at 211°–212° C. (sintered at 210° C.) after recrystallization from a mixture of alcohol (3A anhydrous) and ethyl acetate.

EXAMPLE 4

N-(5-chloro-2-benzoxazolyl)-N-(4-bromobenzyl)-N',N'-dipropylethylenediamine tartrate By replacing the N-benzyl-N',N'-dimethylethylenediamine and the 2-chlorobenzoxazole reactants employed in Example 3 with an equimolecular quantity of N-(4-bromobenzyl)-N',N'-dipropylethylenediamine and 2,5-dichlorobenzoxazole respectively and following substantially the same procedure described in Example 3, there is obtained N - (5-chloro-2-benzoxazolyl)-N-(4-bromobenzyl)-N',N'-dipropylethylenediamine. The base was treated with one equivalent of tartaric acid by substantially the same procedure described in Example 1 to form the salt of the base, thus yielding N-(5-chloro-2-benzoxazolyl)-N-(4-bromobenzyl) - N',N' - dipropylethylenediamine tartrate.

EXAMPLE 5

N-(6-chloro-2-benzoxazolyl)-N-(4-fluorobenzyl)-2-(4-morpholinyl)-ethylamine phosphate By replacing the N-benzyl-N',N'-dimethylethylenediamine and the 2-chlorobenzoxazole reactants employed in Example 3 with an equimolecular quantity of N-(4-fluorobenzyl)-2-(4 - morpholinyl) - ethylamine and 2,6-dichlorobenzoxazole respectively and following substantially the same procedure described in Example 3, there is obtained N-(6-chloro-2-benzoxazolyl)-N - (4 - fluorobenzyl) - 2 - (4 - morpholinyl) - ethylamine. The base was treated with one quivalent of phosphoric acid by substantially the same procedure described in Example 1 to form the salt of the base, thus yielding N-(6-chloro-2-benzoxazolyl) - N - (4 - fluorobenzyl) - 2 - (4-morpholinyl)-ethylamine phosphate.

EXAMPLE 6

N-(7-chloro-2-benzoxazolyl)-N-(2-ethoxybenzyl)-3-(1-piperidyl)-propylamine hydrochloride By replacing the N-benzyl-N',N'-dimethylethylenediamine and the 2-chlorobenzoxazole reactants employed in Example 3 with an equimolecular quantity of N-(2-ethoxybenzyl)-3 - (1 - piperidyl) - propylamine and 2,7-dichlorobenzoxazole respectively and following substantially the same procedure described in Example 3, there is obtained N-(7-chloro-2-benzoxazolyl) - N - (2-ethoxybenzyl)-3-(1 - piperidyl) - propylamine. The base was treated with one equivalent of hydrogen chloride by substantially the same procedure described in Example 3 to form the salt of the base, thus yielding N-(7-chloro-2-benzoxazolyl) - N - (2 - ethoxybenzyl)-3-(1-piperidyl)-propylamine hydrochloride.

EXAMPLE 7

N-(5-methoxy-2-benzoxoxazolyl)-N-benzyl-2-(1-pyrrolidyl)-ethylamine hydrochloride By replacing the N-benzyl-N',N'-dimethylethylenediamine and the 2-chlorobenzoxazole reactants employed in Example 3 with an equimolecular quantity of N-benzyl-2 - (1 - pyrrolidyl) - ethylamine and 2-chloro-5-methoxybenzoxazole respectively and following substantially the same procedure described in Example 3, there is obtained N-(5-methoxy - 2 - benzoxazolyl)-N-benzyl-2-(1-pyrrolidyl)-ethylamine. The base was treated with one equivalent of hydrogen chloride by substantially the same procedure described in Example 3 to form the salt of the base, thus yielding N-(5-methoxy-2-benzoxazolyl) - N - benzyl - 2 - (1 - pyrrolidyl) - ethylamine hydrochloride.

EXAMPLE 8

N-(5-tert.-butyl-2-benzoxazolyl)-N-(4-propoxylbenzyl)-N',N'-diethylethylenediamine hydrochloride By replacing the N-benzyl-N',N'-dimethylethylenediamine and the 2-chlorobenzoxazole reactants employed in Example 3 with an equimolecular quantity of N-(4-propoxybenzyl) - N',N' - diethylethylenediamine and 5-tert.-butyl-2-chlorobenzoxazole respectively and following substantially the same procedure described in Example 3, there is obtained N-(5-tert.-butyl-2-benzoxazolyl)-N-(4 - propoxybenzyl) - N',N' - diethylethylenediamine. The base was treated with one equivalent of hydrogen chloride by substantially the same procedure described in Example 3 to form the salt of the base, thus yielding N-(5-tert.-butyl-2-benzoxazolyl)-

N-(4 - propoxybenzyl) - N',N' - diethylethylenediamine hydrochloride.

EXAMPLE 9

*N-(5-bromo-2-benzoxazolyl)-N-(4-isopropylbenzyl)- N',N'-dimethylethylenediamine p-toluenesulfonate*

By replacing the N-benzyl-N',N'-dimethylethylenediamine and the 2-chlorobenzoxazole reactants employed in Example 3 with an equimolecular quantity of N-(4 - isopropylbenzyl) - N',N' - dimethylethylenediamine and 5-bromo-2-chlorobenzoxazole respectively and following substantially the same procedure described in Example 3, there is obtained N-(5 - bromo - 2 - benzoxazolyl) - N - (4 - isopropylbenzyl) - N',N' - dimethylethylenediamine. The base was treated with one equivalent of p-toluenesulfonic acid by substantially the same procedure described in Example 1 to form the salt of the base, thus yielding N-(5 - bromo - 2 - benzoxazolyl) - N - (4 - isopropylbenzyl) -N',N' - dimethylethylenediamine p-toluenesulfonate.

EXAMPLE 10

*N-(5-methoxy-2-benzoxazolyl)-N-(2-ethylbenzyl) N',N'-dimethylethylenediamine hydrochloride*

By replacing the N-benzyl-N',N'-dimethylethylenediamine and the 2-chlorobenzoxazole reactants employed in Example 3 with an equimolecular quantity of N-(2-ethylbenzyl) - N',N' - dimethylethylenediamine and 2-chloro-5-methoxybenzoxazole respectively and following substantially the same procedure described in Example 3, there is obtained N-(5 - methoxy - 2 - benzoxazolyl) - N - (2 - ethylbenzyl) - N',N' - dimethylethylenediamine. The base was treated with one equivalent of hydrogen chloride by substantially the same procedure described in Example 3 to form the salt of the base, thus yielding N-(5-methoxy-2-benzoxazolyl)-N - (2 - ethylbenzyl) - N',N' - dimethylethylenediamine hydrochloride.

What is claimed is:

1. A 2-aminobenzoxazole selected from the group consisting of compounds having the general structural formula

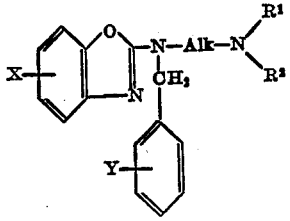

and their non-toxic acid addition salts wherein X and Y respectively is selected from the group consisting of hydrogen, halogen, a lower alkyl and a lower alkoxy radical; Alk is a straight chain alkylene radical having at least two and no more than three carbon atoms; and

is a tertiary amino radical selected from the group consisting of a di-lower alkyl amino, the pyrrolidyl, piperidyl and morpholinyl radicals.

2. A 2-aminobenzoxazole having the general structural formula

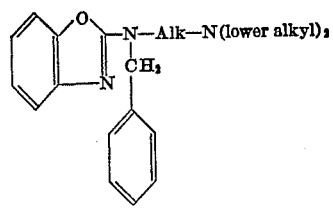

wherein Alk is a straight chain alkylene radical having at least two and no more than three carbon atoms.

3. A non-toxic acid addition salt of a 2-aminobenzoxazole having the general structural formula

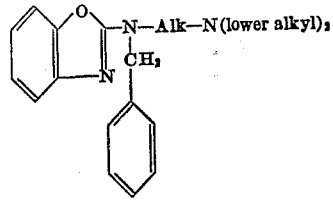

wherein Alk is a straight chain alkylene radical having at least two and no more than three carbon atoms.

4. N-(2-benzoxazolyl)-N-benzyl-N',N'-dimethylethylenediamine.

5. N-(2-benzoxazolyl) -N- benzyl-N',N'-dimethyl-1,3-propanediamine.

6. A method for the preparation of a 2-aminobenzoxazole comprising condensing a 2-halobenzoxazole having the general formula

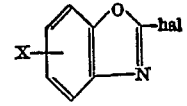

wherein X is selected from the group consisting of hydrogen, halogen, lower alkyl and lower alkoxy radicals and hal is a halogen radical with an alkylenediamine having the general formula

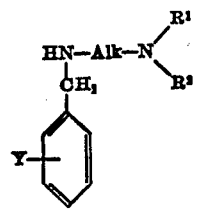

wherein Y is selected from the group consisting of hydrogen, halogen, lower-alkyl and lower-alkoxy radicals; Alk is a lower alkylene radical; and

is a tertiary amino radical selected from the group consisting of a di-lower alkyl amino, pyrrolidyl, piperidyl and morpholinyl radicals.

References Cited in the file of this patent

Hoggarth: Journal Chem. Society, 1949, pp. 3311–15.